US011514038B2

(12) United States Patent
Wang

(10) Patent No.: US 11,514,038 B2
(45) Date of Patent: Nov. 29, 2022

(54) SYSTEMS AND METHODS FOR QUANTUM GLOBAL OPTIMIZATION

(71) Applicant: Georgia Tech Research Corporation, Atlanta, GA (US)

(72) Inventor: Yan Wang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 551 days.

(21) Appl. No.: 16/664,703

(22) Filed: Oct. 25, 2019

(65) Prior Publication Data

US 2020/0133947 A1 Apr. 30, 2020

Related U.S. Application Data

(60) Provisional application No. 62/750,460, filed on Oct. 25, 2018.

(51) Int. Cl.

| | |
|---|---|
| ***G06F 16/24*** | (2019.01) |
| ***G06F 16/2453*** | (2019.01) |
| ***G06N 10/00*** | (2022.01) |
| ***G06F 17/11*** | (2006.01) |
| ***G06F 17/18*** | (2006.01) |

(52) U.S. Cl.

CPC .......... *G06F 16/2453* (2019.01); *G06F 17/11* (2013.01); *G06F 17/18* (2013.01); *G06N 10/00* (2019.01)

(58) Field of Classification Search

CPC ...... G06F 16/2453; G06F 17/18; G06F 17/11; G06N 10/00; G06N 10/20; G06N 10/40; G06N 10/60; G06N 10/70; G06N 10/80

See application file for complete search history.

(56) References Cited

U.S. PATENT DOCUMENTS

| | | | | |
|---|---|---|---|---|
| 6,578,018 B1 * | 6/2003 | Ulyanov | ................ | B82Y 10/00 706/14 |
| 7,028,275 B1 * | 4/2006 | Chen | ...................... | G06N 10/00 703/2 |
| 10,860,759 B2 * | 12/2020 | Roetteler | .............. | G06F 30/327 |
| 11,238,043 B2 * | 2/2022 | Hu | ......................... | G06N 10/20 |
| 11,245,519 B1 * | 2/2022 | Stapleton, Jr. | ........ | H04L 9/0858 |
| 11,366,897 B1 * | 6/2022 | Ramanathan | ......... | H04L 9/0861 |
| 11,449,799 B1 * | 9/2022 | Arbajian | ................. | H04L 9/302 |
| 2004/0024750 A1 * | 2/2004 | Ulyanov | ................ | G06N 10/00 |
| 2006/0224547 A1 * | 10/2006 | Ulyanov | ................ | B82Y 10/00 706/62 |
| 2009/0164435 A1 * | 6/2009 | Routt | ..................... | B82Y 10/00 |
| 2011/0145288 A1 * | 6/2011 | Hall | ....................... | G06N 10/00 707/E17.014 |

(Continued)

*Primary Examiner* — Merilyn P Nguyen

(74) *Attorney, Agent, or Firm* — Troutman Pepper Hamilton Sanders LLP; Ryan A. Schneider

(57) ABSTRACT

A method for global optimization is disclosed. The method may include receiving a search request that may include an input. The method may further determine an amount of rotations necessary to perform the search request with a Grover Search algorithm. Then, the method may include determining that the amount of rotations is less than a predefined amount. Further, the method may generate one or more quantum walks. The one or more quantum walks and the Grover Search algorithm may be used to generated a global optimization algorithm. The method may then execute the global optimization algorithm to identify the input.

18 Claims, 12 Drawing Sheets

START

100

110 RECEIVE SEARCH REQUEST

120 DETERMINE AMOUNT OF ROTATIONS NECESSARY TO PERFORM REQUEST

130 DETERMINE AMOUNT OF ROTATIONS IS LESS THAN PREDEFINED AMOUNT

140 GENERATE QUANTUM WALKS

150 REPLACE ROTATIONS WITH THE QUANTUM WALKS

160 GENERATE GLOBAL OPTIMIZATION ALGORITHM

170 EXECUTE GLOBAL OPTIMIZATION ALGORTIHM

END

(56) References Cited

U.S. PATENT DOCUMENTS

2013/0096698 A1* 4/2013 Ulyanov ............ G05B 13/0295
700/30
2017/0076220 A1* 3/2017 Walters .................. G06N 7/005
2018/0032896 A1* 2/2018 Fleischer ................ G06F 17/14
2018/0189653 A1* 7/2018 Burchard ............... G06N 5/006
2018/0246851 A1* 8/2018 Zaribafiyan ............. G06F 17/18
2019/0220497 A1* 7/2019 Wiebe ..................... G06F 17/12
2019/0220782 A1* 7/2019 Chen ...................... G06N 10/00
2019/0258696 A1* 8/2019 Burchard ............... G06Q 10/04
2019/0392343 A1* 12/2019 Haah ....................... G06F 17/12
2020/0134503 A1* 4/2020 Lupton .................. G06N 20/10
2020/0349459 A1* 11/2020 Cao ......................... G06F 17/11
2021/0374761 A1* 12/2021 Ramanathan ........ G06Q 30/018
2021/0406954 A1* 12/2021 Kachman ................ G06F 17/11
2022/0231844 A1* 7/2022 Berend ................. H04L 9/0838

* cited by examiner

SYSTEMS AND METHODS FOR QUANTUM GLOBAL OPTIMIZATION

CROSS-REFERENCE TO RELATED APPLICATION

This Application claims the benefit of, and priority under 35 U.S.C. § 119(e) to, U.S. Provisional Patent Application No. 62/750,460, entitled "Quantum Walk Enhanced Grover Search Algorithm for Global Optimization on Quantum Computer," filed Oct. 25, 2018, the contents of which are hereby incorporated by reference herein in their entirety as if fully set forth below.

FIELD OF THE INVENTION

The presently disclosed subject matter relates generally to systems and methods for quantum global optimization and, more particularly, to systems and methods for enhancing the Grover Search Algorithm through continuous-time quantum walks on a quantum computer.

BACKGROUND

In the past decade, quantum computation has been used to solve various scientific and engineering problems. Quantum computers have been used to improve both time and space efficiency. One of the significant breakthroughs in quantum computation involves Grover's Search algorithm for unsorted database research, which can improve the computational efficiency by optimizing the number of Grover rotations.

Despite these advantages, there is another aspect of the search efficiency, which is the threshold functional value. The threshold is important in convergence speed because it determines the number of solutions out of a total of possibilities in the discretized solution space.

Accordingly, there is a need for improved systems and methods that improve global optimization, and more specifically involve the threshold functional value in performing a search with Grover Search algorithm.

SUMMARY

Aspects of the disclosed technology include systems and methods for predicting survival rates of a prospective organ recipient. Consistent with the disclosed embodiments, the methods may include a quantum computer, a quantum computer emulator, a quantum transistor, a fabric of programmable elements, a support circuitry, a memory, and/or one or more databases. One exemplary method may include receiving a search request comprising an input. The method may include determining an amount of rotations necessary to perform the search request with a Grover Search algorithm. Further, the method may determine that the amount of rotations is less than a predefined amount. Then, the method may generate one or more quantum walks, which the method may be used to replace the rotations in the Grover Search algorithm. Next, the method may include generating a global optimization algorithm based on the Grover search algorithm and the one or more quantum walks. The method may further execute the global optimization algorithm to identify the input.

In some embodiments, identifying the input with the global optimization algorithm may have a first computational cost.

In some embodiments, the method may further include estimating a second computational cost for identifying the input using the Grover Search algorithm.

According to some embodiments, the first computational cost is less than the second computational cost.

In some embodiments, generating the one or more quantum walks may involve determining a functional integral by applying an equation (9) of:

$$\begin{aligned} F_{n,0} &= \sum_{l=0}^{\infty}\left[dq_{n,0}^{(l)} e^{-ir(1+i)b/\Delta^2 - V_n r}(-1)^l i^n\right], \\ &= \sum_{l=0}^{\infty} e^{-br/\Delta^2} \frac{\left(\frac{br}{2\Delta^2}\right)^{2l+n}}{l!(n+l)!} e^{-i\tau r(1+i)b/\Delta^2 - V_n r}(-1)^l i^n \\ &= i^n e^{-ibr/\Delta^2 - V_n r} \sum_{l=0}^{\infty} \frac{(-1)^l \left(\frac{br}{2\Delta^2}\right)^{2l+n}}{l!(n+l)!} \\ &= i^n e^{-ibr/\Delta^2 - V_n r} J_n\left(\frac{br}{\Delta^2}\right) \end{aligned}$$

where a unitary quantum walk operator (U) is represented as $u_{jk}=F_{(j-l),0}$ for a given space resolution Δ and a time resolution r.

In some embodiments, generating the one or more quantum walks may involve applying an equation of:

$$\psi_j(t+r) = \sum_k F_{(j-k),0}\psi_k(t),$$

where t is a time, Ψ(t) is an amplitude associated with the time t, a first quantum walk from the one or more quantum walks is Ψ(t+r), and a $j^{th}$ element is represented as (j=1, . . . , N).

According to some embodiments, updating the $j^{th}$ element by applying the equation of:

$$\psi_j(t+r) = F_{(j-K),0} = i^{(j-K)} e^{-ibr/\Delta^2 - V_j r} J_{(j-K)}\left(\frac{br}{\Delta^2}\right),$$

where K is an index between 1 and N, $\Psi_K$ (t)=1.0, and $\Psi_{k\neq K}$ (t)=0.0.

In some embodiments, determining a probability that j is observed by applying the equation of:

$$Pr(x=j) = \psi_j^*(t+r)\psi_j(t+r) = C_0 e^{-2V_j r} J_{(j-K)}^2\left(\frac{br}{\Delta^2}\right),$$

where $C_0$ is a normalization factor that ensures that $\Sigma_{j=1}^{N}$ Pr(x=j)=1.

In some embodiments.

*Rc*=[0,0,0,0,1,1,0,1,1,2,1,2,3,1,4,5,1,6,2,7,9,11,13,16, 5,20,24,23,31,2,41,49,4,60,72,9,88,105,125,3, 149,22,133,219]

is the amount of rotations necessary to perform the search request with the Grover Search algorithm.

In some embodiments, the global optimization algorithm is represented by:

```
1: Rc = [0, 0, 0, 0, 1, 1, 0, 1, 1, 2, 1, 2, 3, 1, 4, 5, 1, 6, 2, 7, 9, 11, 13, 16, 5, 20, 24, 28, 34, 2, 41,
2:      49, 4, 60, 72, 9, 88, 105, 125, 3, 149, 22, 183, 219]
3: t ← 0;
4: i ← 0;
5: initialize ψ(x0) = 1.0 at a selected position x0;
6: Compute U = F(τ, Δ, b(t), V) by Eq.(9);
7: |ψ⟩ = U|ψ⟩;          ▷ perform one iteration of quantum walk to find initial solution x*
8: randomly sample an x* based on probablity distribution ψ^2(x);
9: initialize threshold value c = V(x*);
10: while i <MAX-ITER and stop criteria not met do          ▷ main iterations of search
11:   R = Rc[i];
12:   i = i + 1;
13:   if R ≤ R0 then
14:       initialize ψ(xi) = 1.0 at a selected position xi;
15:       Compute U = F(τ, Δ, b(t), V) by Eq.(9);
16:       |ψ⟩ = U|ψ⟩;          ▷ perform one iteration of quantum walk
17:   else
18:       initialize ψ(x) as a uniform distribution by the Hadamard transform;
19:       for r = 1 to R do          ▷ perform R steps of Grover rotations
20:          apply Grover rotation operator to ψ(x);
21:       end for
22:   end if
23:   randomly sample an x0 based on probability distribution ψ^2(x);
24:   if V(x0) < V(x*) then
25:       c ← V(x0);          ▷ update the threshold
26:       x* ← x0;
27:   end if
28:   t = t + τ;
29: end while
```

In some embodiments, the global optimization algorithm may be executed by a quantum computer.

In some embodiments, the global optimization algorithm may be executed by a quantum computer emulator.

Another exemplary method may include receiving a search request comprising an input. The method may further include determining a plurality of rotations necessary to perform the search request with a Grover Search algorithm. Next, the method may generate one or more quantum walks based on the plurality of rotations. Then, the plurality of rotations in the Grover Search algorithm may be replaced with the one or more quantum walks. Further, the method may include generating a global optimization algorithm based on the Grover search algorithm and the one or more quantum walks. Then, the global optimization algorithm may be executed to identify the input Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into and constitute a portion of this disclosure, illustrate various implementations and aspects of the disclosed technology, and, together with the description, serve to explain the principles of the disclosed technology. In the drawings.

DETAILED DESCRIPTION

Some implementations of the disclosed technology will be described more fully with reference to the accompanying drawings. This disclosed technology can be embodied in many different forms, however, and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein can include, but are not limited to, for example, components developed after development of the disclosed technology.

It is also to be understood that the mention of one or more method steps does not imply that the methods steps must be performed in a particular order or preclude the presence of additional method steps or intervening method steps between the steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
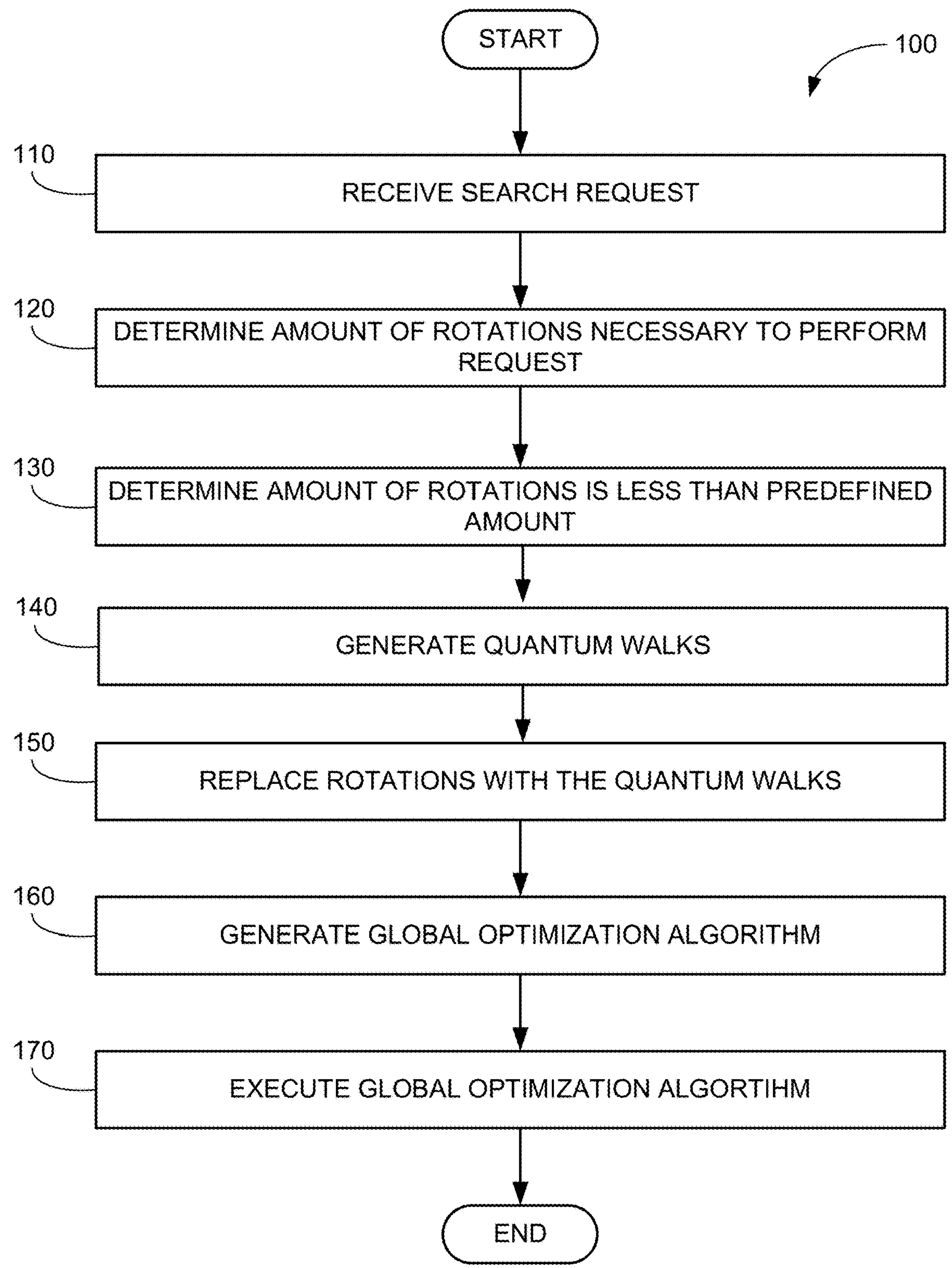
FIG. 1 is an example flow chart of a method for global optimization, in accordance with some examples of the present disclosure.

FIG. 1 shows an example flow chart of a method 100 for global optimization that may be performed by a quantum computer and/or a quantum computer emulator. At 110, the method may receive a search request that may include an input. At 120, the amount of rotations necessary to perform the search request with a Grover Search algorithm may be determined. Further, at 130, the method may determine that the amount of rotations is less than a predefined amount. After this determination, at 140, one or more quantum walks may be generated. Then, at 150, the rotations associated with the Grover search algorithm may be replaced with the one or more quantum walks. At 160, the global optimization algorithm may be generated based on the Grover Search algorithm and the one or more quantum walks. At 170, the global optimization algorithm may be executed by, for example, a quantum computer to identify the input.

Figure 2:
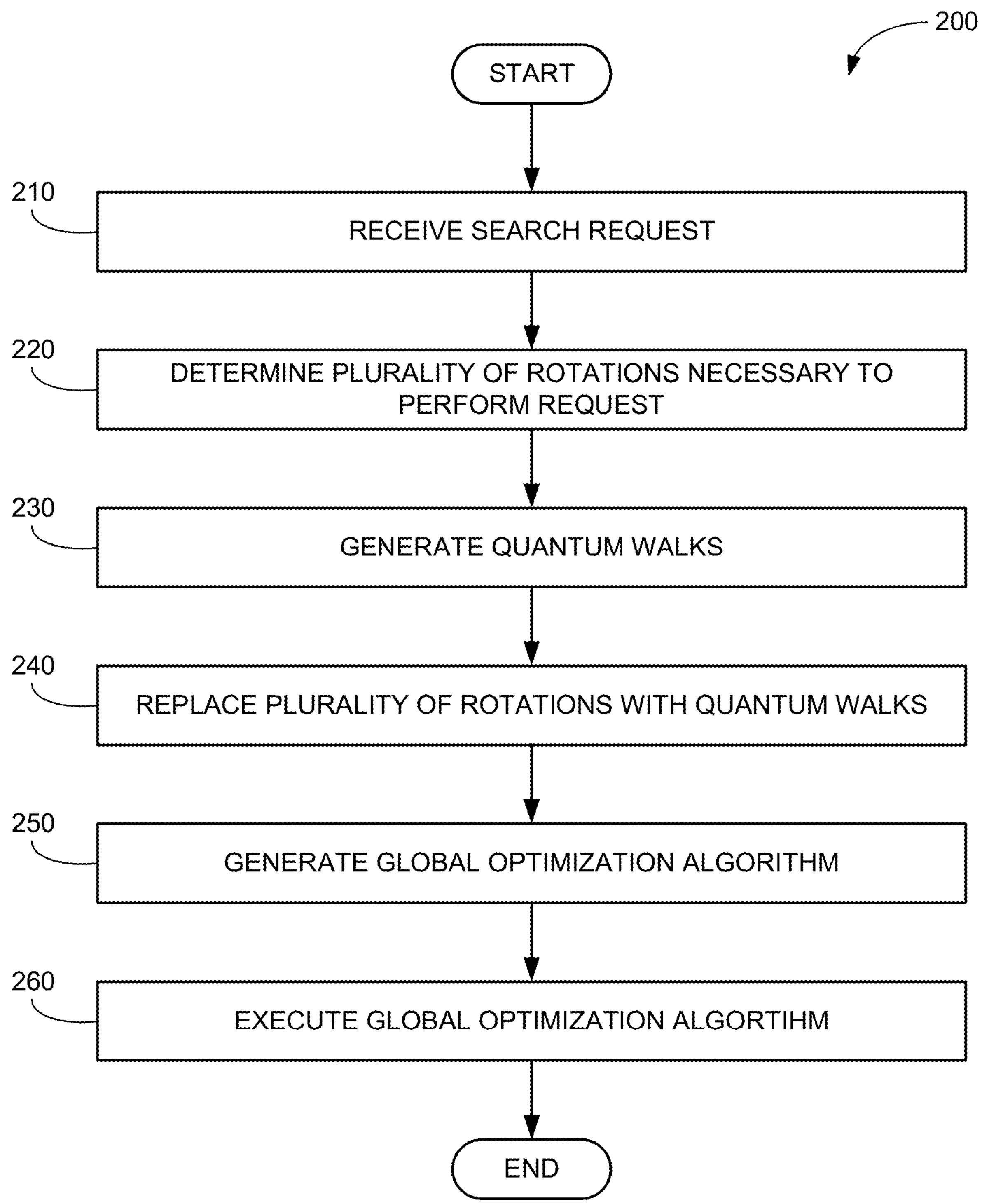
FIG. 2 is another example flow chart of a method for global optimization, in accordance with some examples of the present disclosure.

FIG. 2 shows another example flow chart of a method 200 for global optimization that may also be performed by a quantum computer and/or a quantum computer emulator. At 210, the method may receive a search request that may include an input. At 220, a plurality of rotations necessary to perform the search request with a Grover Search algorithm may be determined. Further, at 230, the method may generate one or more quantum walks based on the plurality of rotations. Then, at 240, the rotations associated with the Grover search algorithm may be replaced with the one or more quantum walks. At 250, the global optimization algorithm may be generated based on the Grover Search algorithm and the one or more quantum walks. At 260, the global optimization algorithm may be executed by, for example, a quantum computer to identify the input.

Figure 3A:
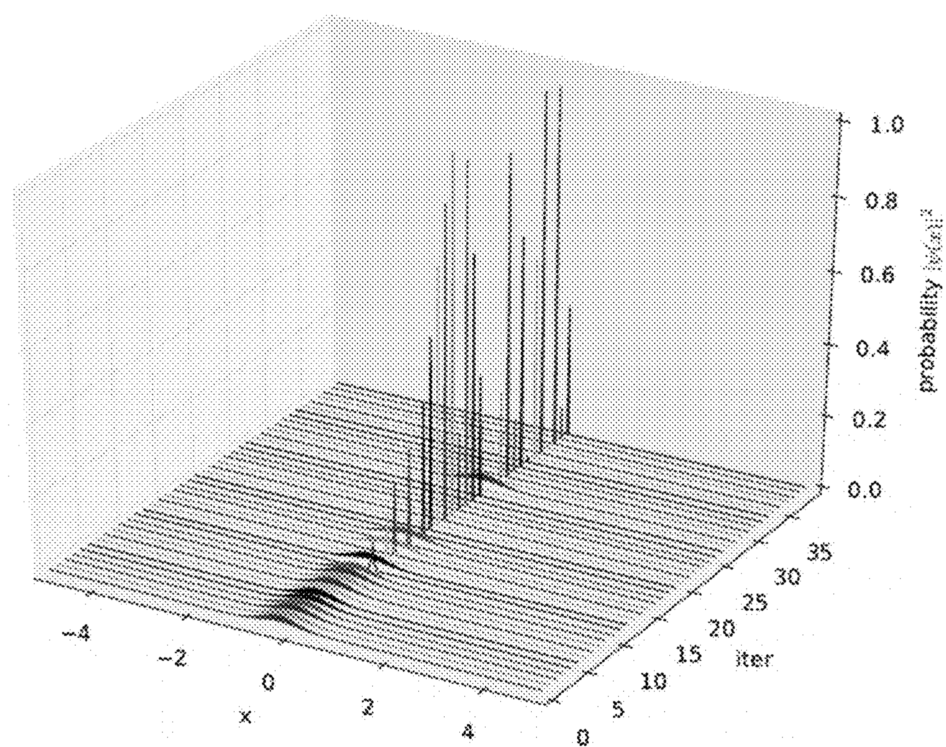
FIGS. 3A-B are graphs illustrating an average Probability Density Function (PDF) by blocked weighted bootstrap quantum walk (BBW-QW) algorithm and a blocked weighted bootstrap (BBW) algorithm, respectively, in accordance with some examples of the present disclosure.
Figure 3B:
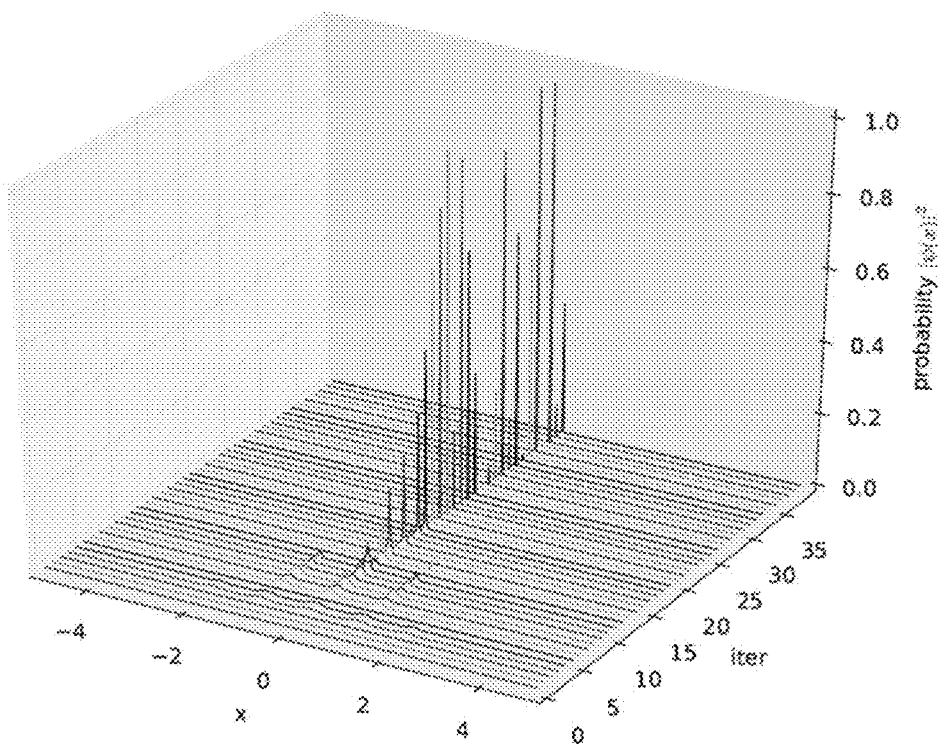
Figure 4A:
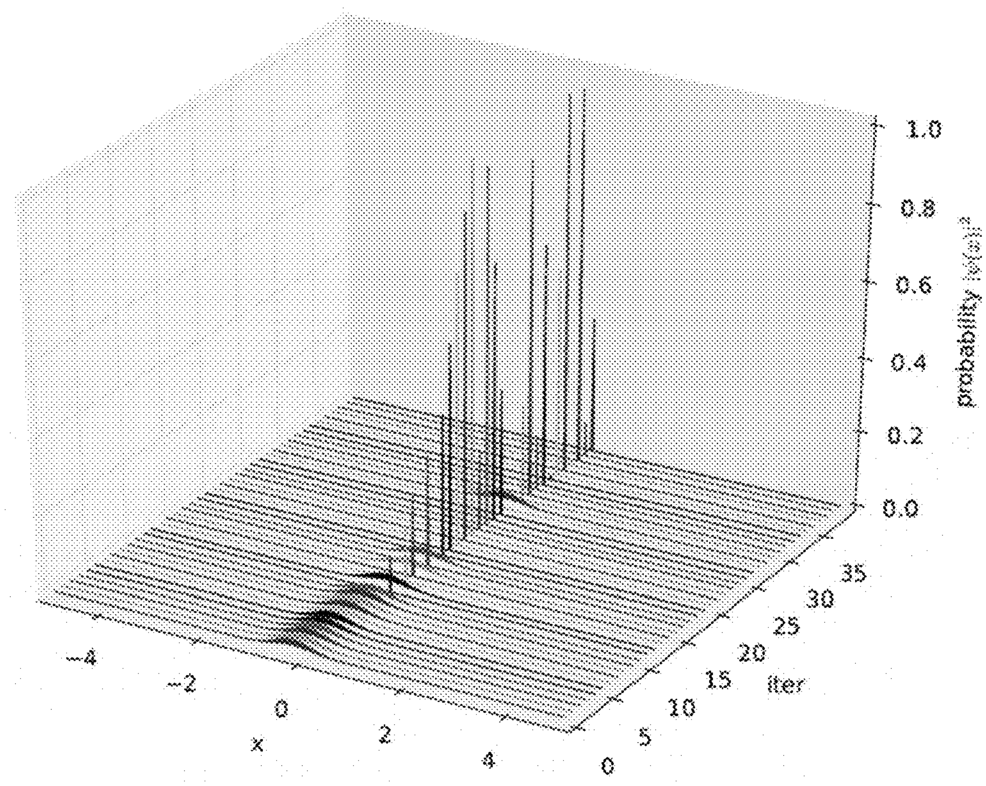
FIGS. 4A-B are graphs illustrating typical PDF by a BBW-QW algorithm and typical BBW algorithm, respectively, in accordance with some examples of the present disclosure.
Figure 4B:
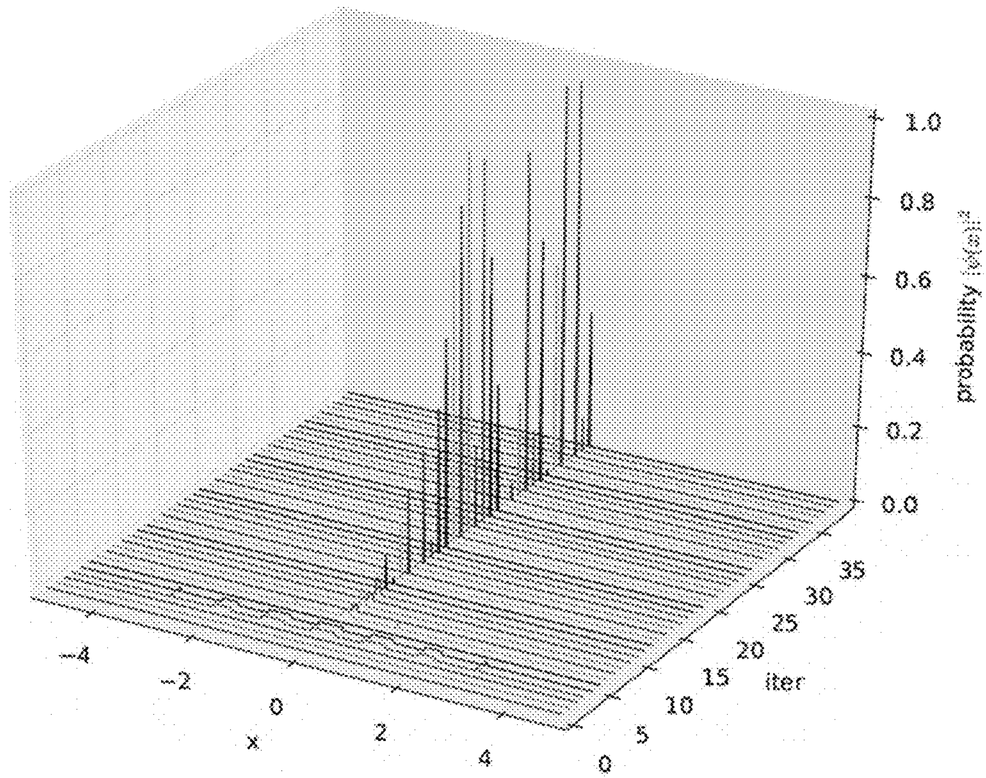

FIGS. 3A-B illustrate an average Probability Density Function (PDF) by blocked weighted bootstrap quantum walk (BBW-QW) algorithm and a blocked weighted bootstrap (BBW) algorithm, respectively. As shown, the average PDF's over 20 runs of search may be compared between the proposed quantum walk Grover Search algorithm and the BBW algorithm, where the rotation threshold $R_0$ is 2. The typical PDF's for only one run of search by the two algorithms may be compared in FIGS. 4A-B. It may be shown that the PDF's are flat and close to the uniform distribution for few rotations in the BBW algorithm. In the proposed BBW-QW algorithm, they may be replaced by a sharper distribution after one step of quantum walk.

Figure 5B:
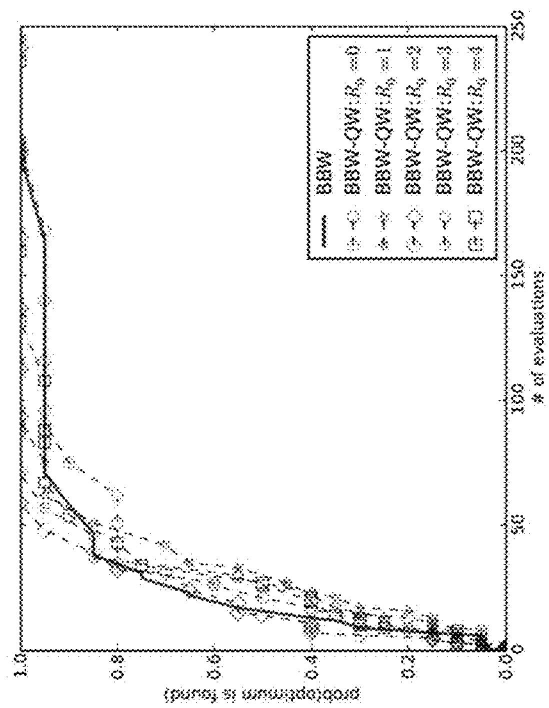
FIG. 5B is a graph illustrating the probability of success of functional evaluations, in accordance with some examples of the present disclosure.
Figure 5A:
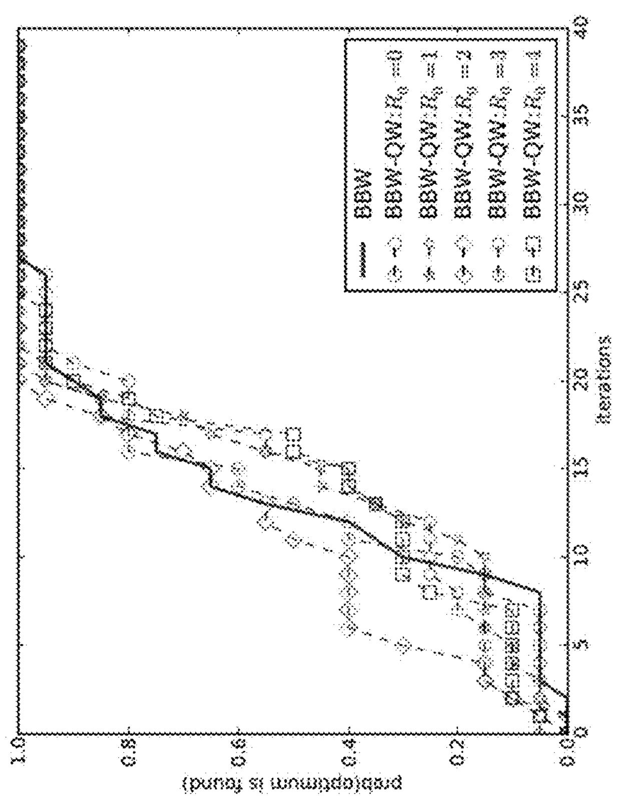
FIG. 5A is a graph illustrating the probability of success of with respect to the iterations, in accordance with some examples of the present disclosure.
Figure 5C:
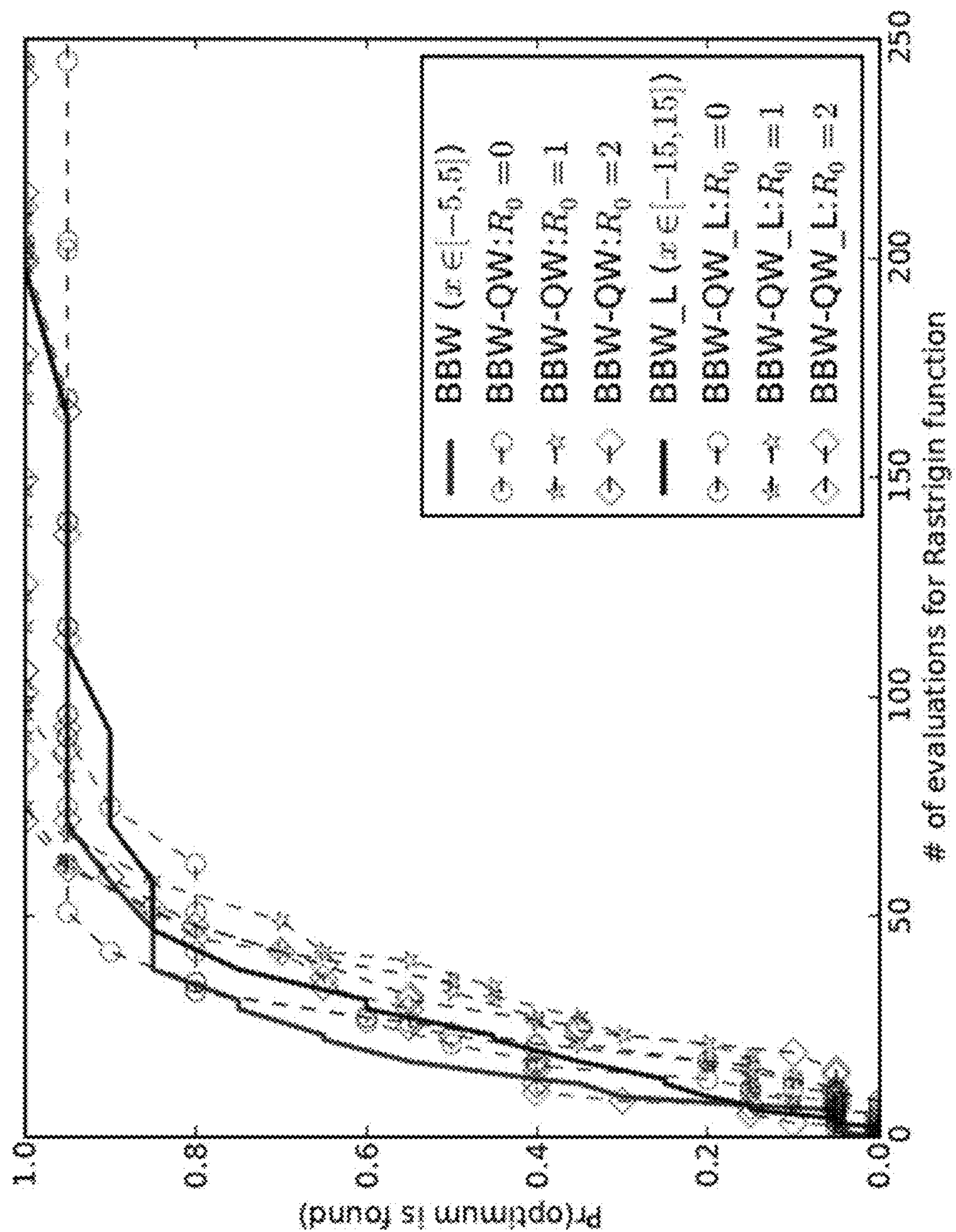
FIG. 5C is a graph illustrating the effect of domain size with respect to functional evaluations, in accordance with some examples of the present disclosure.

FIGS. 5A-B are graphs illustrating the differences between the BBW and the BBW-QW algorithms. FIG. 5C is a graph illustrating the efficiencies of the BBW and the BBW-Qw algorithm when the domain size varies. At the initial stage of search with few iterations, quantum walk may provide higher probabilities of success. For example, it may be shown that when $R_0=2$, the difference between the BBW-QW and the BBW algorithms may be most significant. Further, the benefit of functional evaluations may also be seen at later stages of the search. It can also be seen that the efficiency of the BBW algorithms slightly decreases at the early stage as the domain size increases, whereas it may not change for the BBW-QW algorithm. Further, with about 50 evaluations, both BBW and BBW-QW algorithms may increase the probability of success to about 90%.

Figure 6:
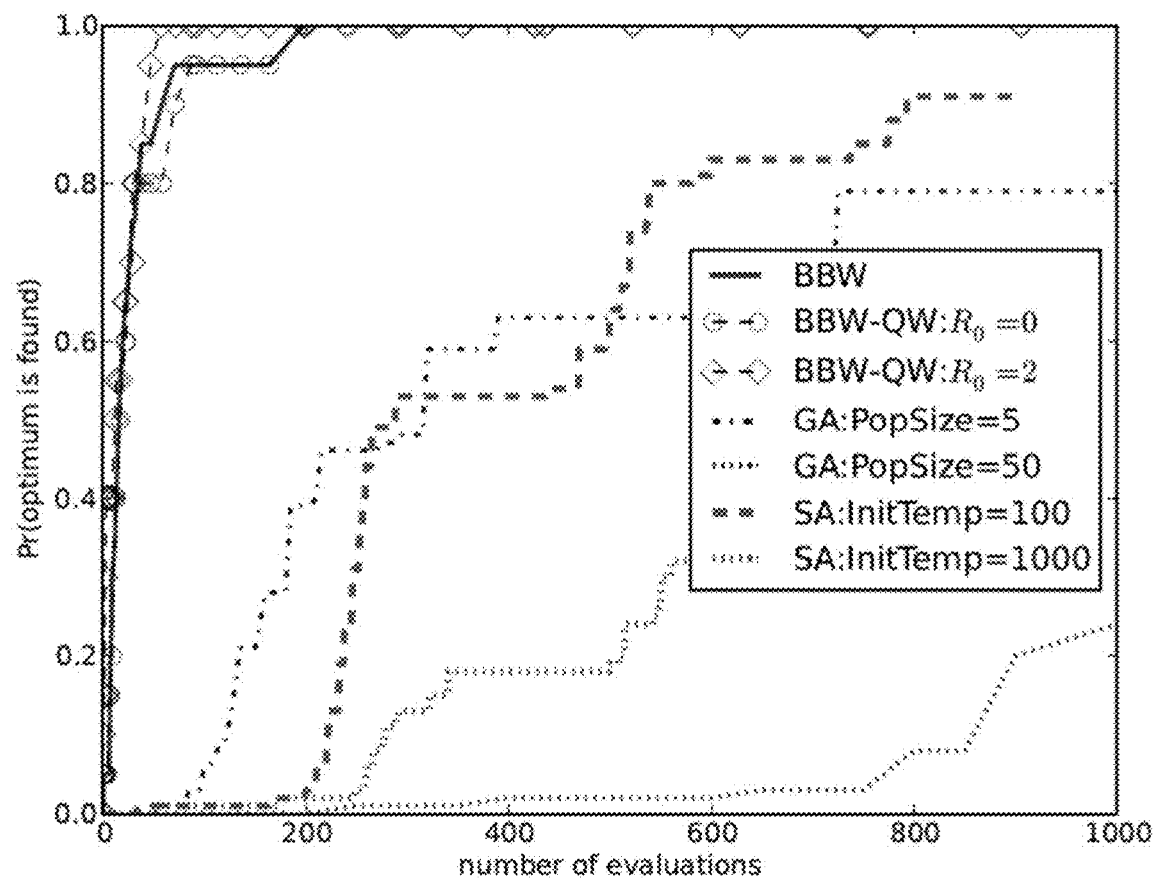
FIG. 6 is a graph illustrating the efficiency of various algorithms, in accordance with some examples of the present disclosure.

FIG. 6 is a graph illustrating the efficiency of various algorithms. More specifically, FIG. 6 illustrates how the quantum search algorithms may compare with traditional global optimization methods, the probabilities of successful search with respect to the number of functional evaluations in the BBW, BBW-QW, simulated annealing, and genetic algorithms (GA) for Rastrigin function. The results from the genetic algorithms with different populations sizes (e.g., 5, 25, and 50) and simulated annealing with different initial temperature (e.g., 100 and 1000) are shown. The optimal solution may be known at x=0. Further, when the distance between a located solution and the known optimum solution is less than a threshold value of $1.0\times10^{-4}$, the search may be deemed a success. The threshold may be chosen to be compatible with the resolution used in the quantum algorithms as a result of the number of available qubits. Moreover, the number of iterations may affect the probability of success. Among the three population sizes, the population size of 25 is the best. Yet, it may be much less efficient than the quantum search algorithms. Similarly, the simulated annealing is not as efficient as the quantum search algorithms.

Figure 7A:
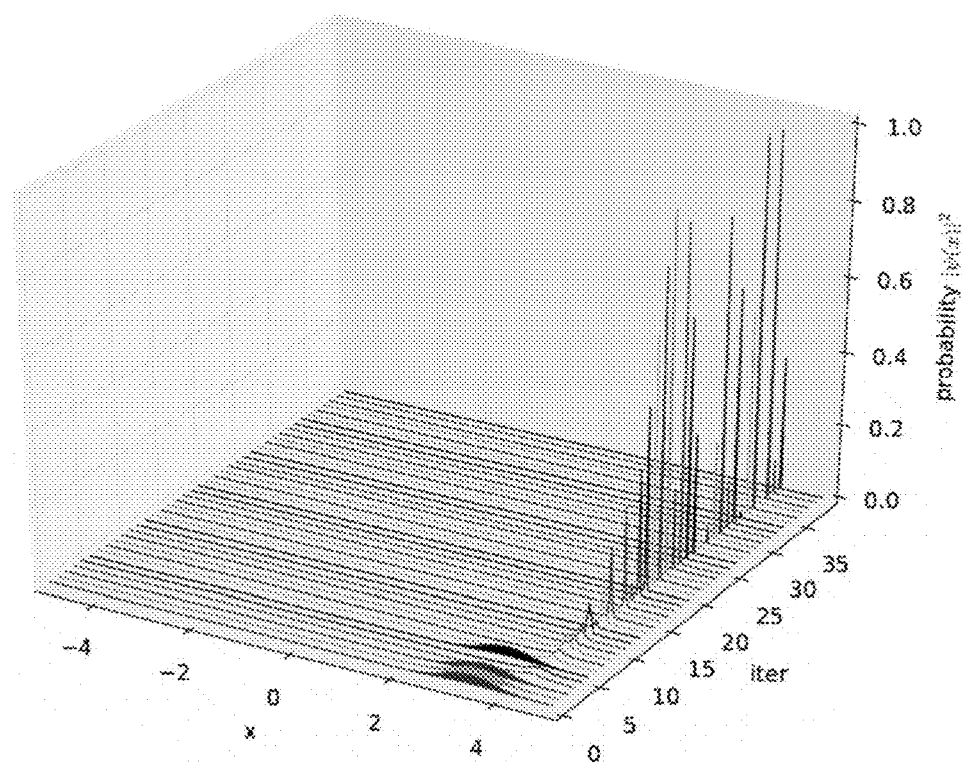
FIGS. 7A-B are graphs illustrating the average PDF by the BBW-QW algorithm and the average PDF by the BBW algorithm, respectively, in accordance with some examples of the present disclosure.
Figure 7B:
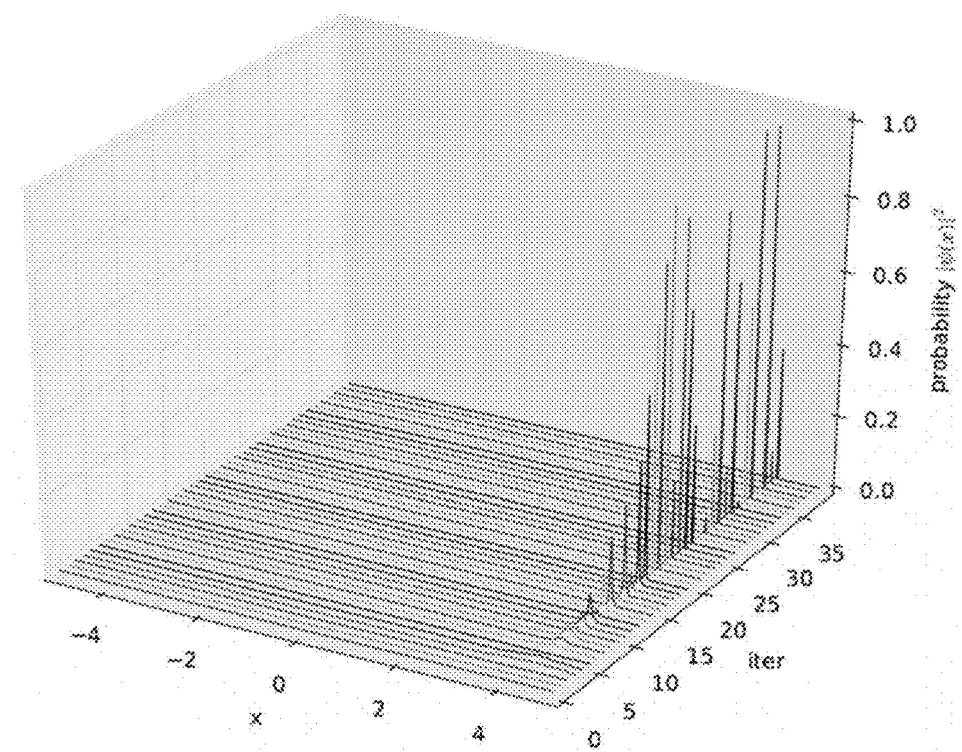
Figure 8A:
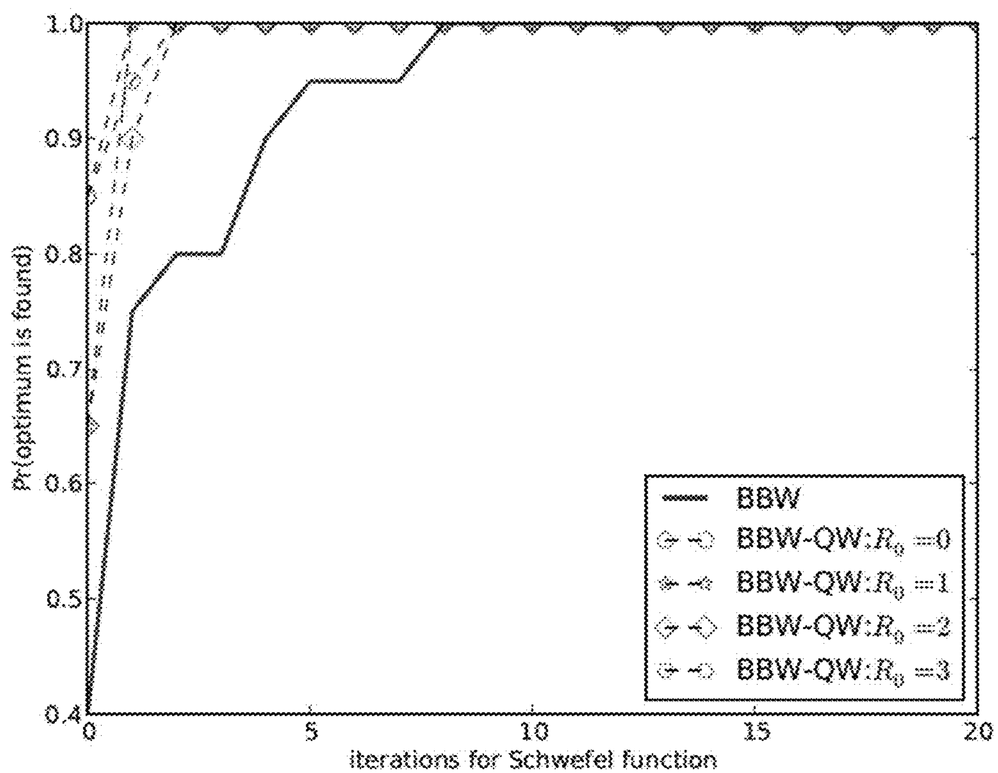
FIGS. 8A-B are graphs illustrating the probability of success of with respect to iterations and the probability of success of functional evaluations, respectively, in accordance with some examples of the present disclosure.
Figure 8B:
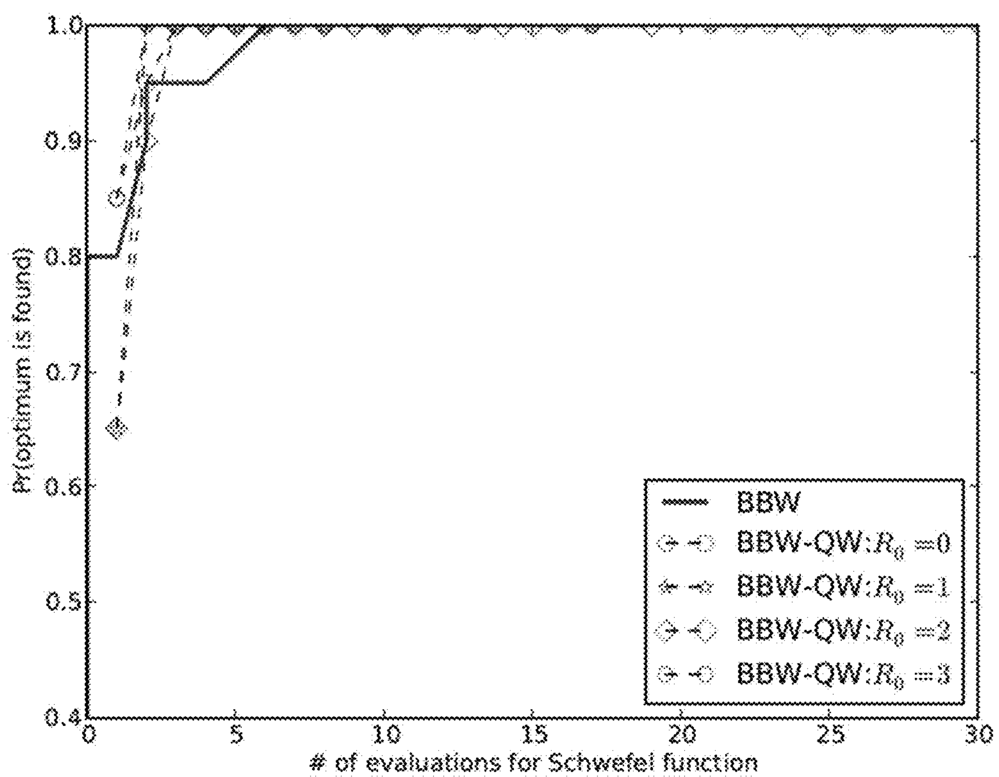

FIGS. 7A-B illustrate the results of the BBW-QW algorithm and the BBW algorithm is searching for Schwefel function where $R_0=0$. Further, the efficiencies of the BBW and BBW-QW algorithms with different $R_0$ values are compared in FIGS. 8A-B. As shown by the graphs, the quantum research algorithms may perform more efficiently for the Schwefel function than for the Rastrigin function. The optimum solution may be found with the probability of one with only few iterations. As a result, the difference between the two algorithms may be relatively small.

Figure 9:
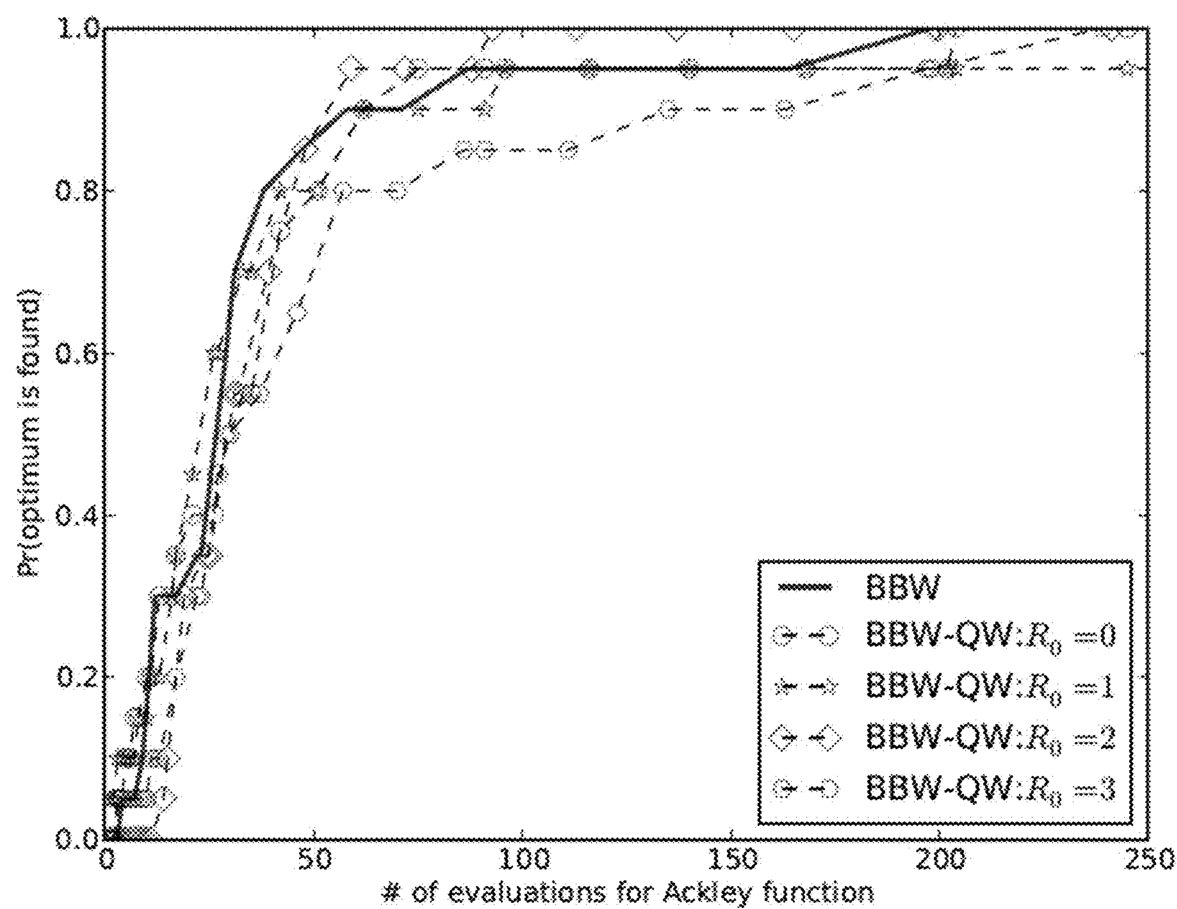
FIG. 9 is another graph illustrating the efficiency of various algorithms, in accordance with some examples of the present disclosure.

FIG. 9 is another graph illustrating the efficiency of various algorithms. In particular, FIG. 9 compares the efficiencies of the BBW and BBW-QW algorithms for the Ackley function. Similar to the Rastrigin function, $R_0=2$ may provide an improvement for the Schwefel function and the Ackley function. It should be noted that the rotational threshold $R_0$ may play a key role of efficiency for the BBW-QW algorithm compared to the BBW algorithm. For example, if $R_0$ is too large, more quantum walks (with additional functional evaluations) are applied during the search, which may decrease the efficiency of the search algorithm. The test results indicate that a threshold value of $R_0<2$ may be good for the test functions. In general, the selection of the value $R_0$ may depend on the complexity of the objective function. If the function has more local optima or wells in the search domain, more quantum walks may be necessary. Therefore, a larger value of $R_0$ may need to be chosen.

Figure 10A:
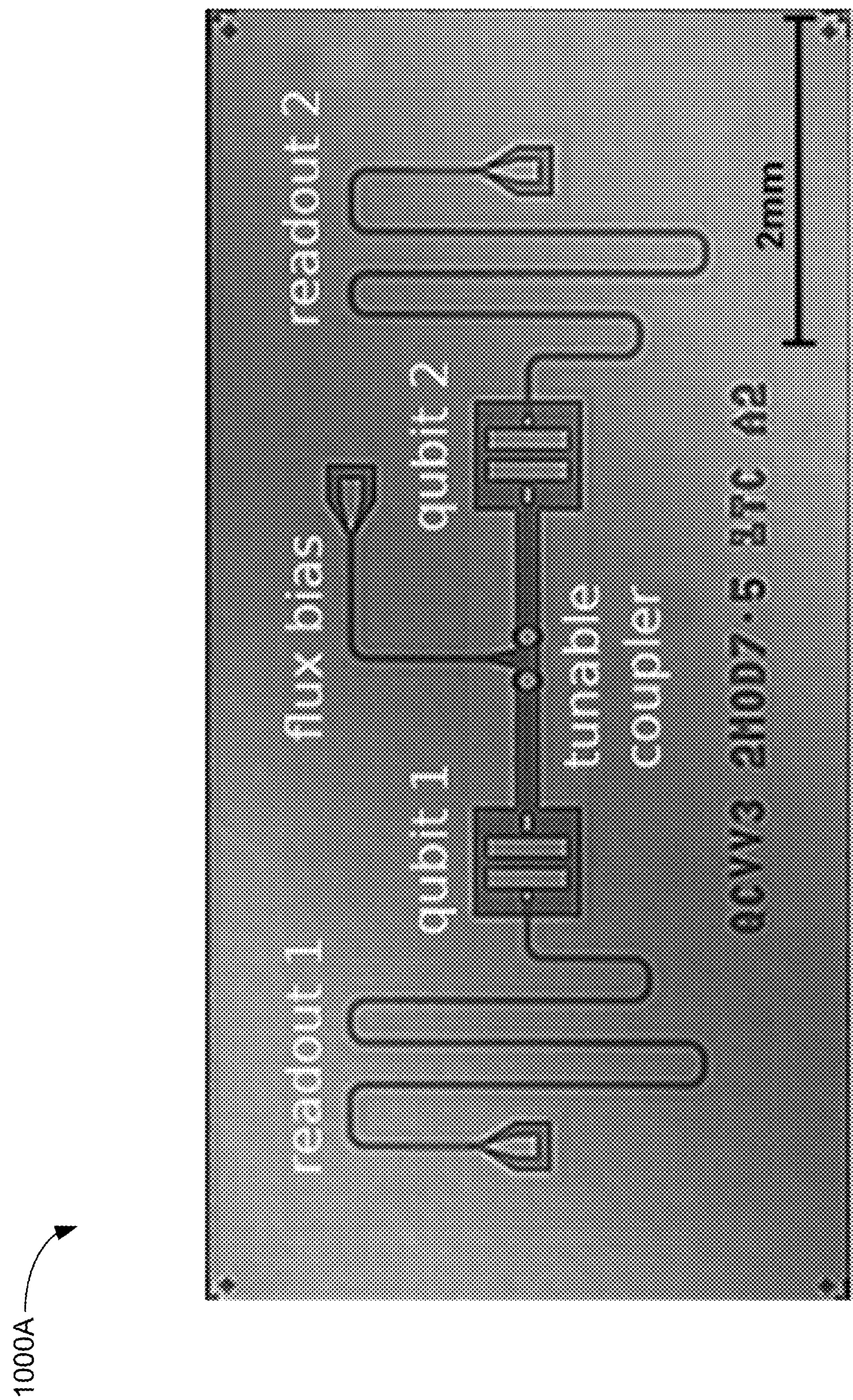
FIGS. 10A-B are examples of a quantum computer in accordance with some examples of the present disclosure, in accordance with some examples of the present disclosure.
Figure 10B:
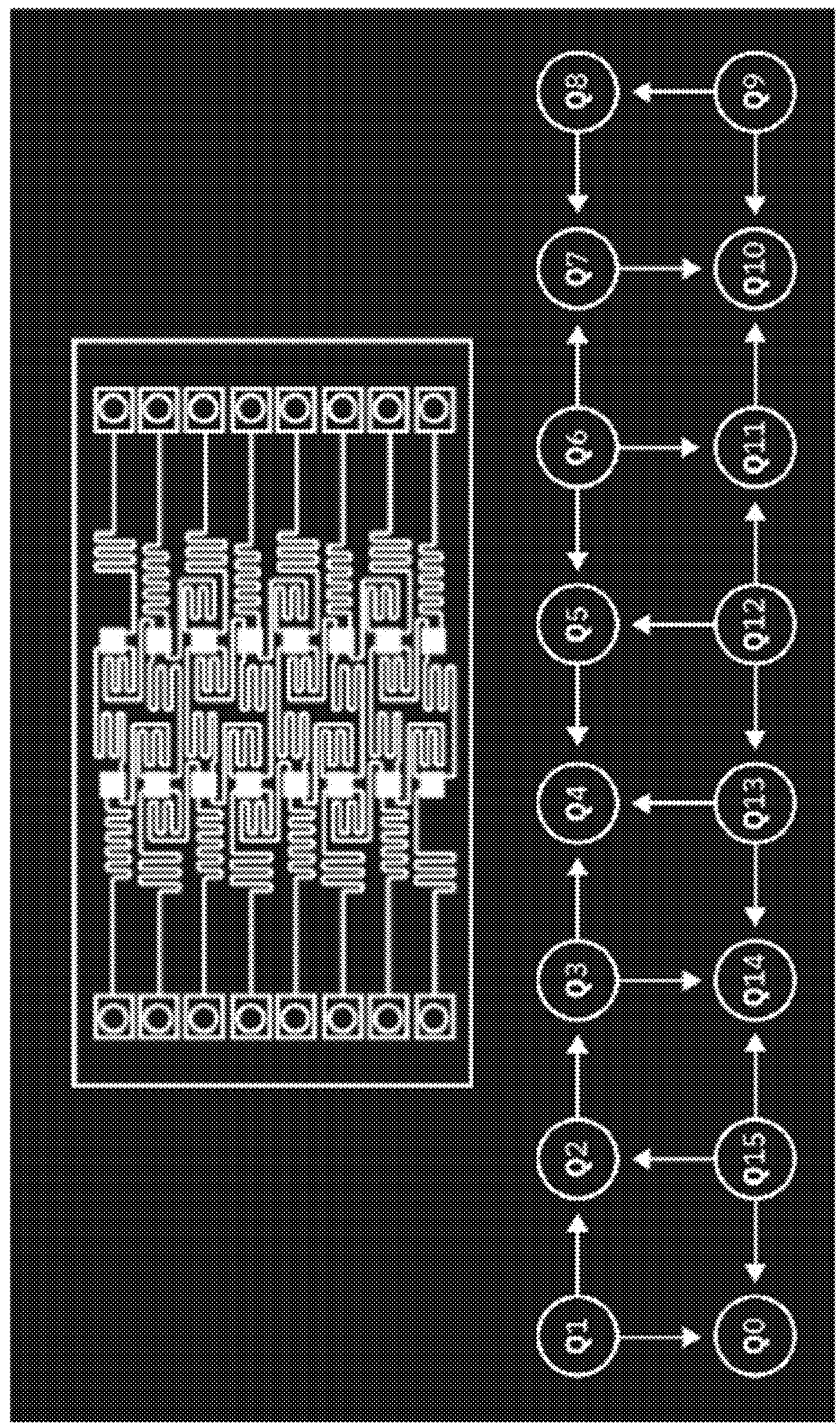

FIGS. 10A-B are examples of a quantum computer in accordance with some examples of the present disclosure. The example architectures 1000A and/or 1000B may implement some or all aspects of the embodiments described herein. For example, the architectures 1000A and/or 1000B may perform the methods 100 and/or 200. The architectures 1000A and 1000B may be a quantum computer or a quantum computer emulator. Therefore, the architectures 1000A and/or 1000B may include a quantum transistor, a fabric of programmable elements that may include a plurality of couplers and/or a plurality of qubits, a support circuitry, and/or a memory.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrase "in one implementation" does not necessarily refer to the same implementation, although it can.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for global optimization comprising:

receiving a search request comprising an input;

determining an amount of rotations necessary to perform the search request with a Grover Search algorithm;

determining that the amount of rotations is less than a predefined amount;

generating one or more quantum walks by determining a functional integral by applying the following equation:

$$\begin{aligned} F_{n,0} &= \sum_{l=0}^{\infty}\left[dq_{n,0^e}^{(l)} e^{-\frac{i\tau(1+i)b}{\Delta^2 - V_n\tau}}(-1)^l i^n\right] \quad ; \\ &= \sum_{l=0}^{\infty} e^{-br/\Delta^2} \frac{\left(\frac{b\tau}{2\Delta^2}\right)^{2l+n}}{l!(n+l)!} e^{-\frac{i\tau(1+i)b}{\Delta^2 - V_n\tau}}(-1)^l i^n \\ &= i^n e^{-\frac{ib\tau}{\Delta^2 - V_n\tau}} \sum_{l=0}^{\infty} \frac{(-1)^l\left(\frac{b\tau}{2\Delta^2}\right)^{2l+n}}{l!(n+l)!} \\ &= i^n e^{-\frac{ib\tau}{\Delta^2 - V_n\tau}} J_n\left(\frac{b\tau}{\Delta^2}\right) \end{aligned}$$

wherein a unitary quantum walk operator (U) is represented as $u_{jk}=F_{(j-k),0}$ for a given space resolution $\Delta$ and time resolution $\tau$;

replacing the rotations in the Grover Search algorithm with the one or more quantum walks;

generating a global optimization algorithm based on the Grover Search algorithm and the one or more quantum walks; and executing the global optimization algorithm to identify the input.

2. The method of claim 1, wherein executing the global optimization algorithm to identify the input has a first computational cost.

3. The method of claim 2 further comprising estimating a second computational cost for using the Grover Search algorithm to identify the input.

4. The method of claim 3, wherein the first computational cost is less than the second computational cost.

5. The method of claim 1, wherein generating the one or more quantum walks further comprises applying the following equation:

$$\psi_j(t+\tau) = \sum F_{(j-k),0\psi_j}(t);$$

and wherein t is a time, $\psi(t)$ is an amplitude associated with the time t, a first quantum walk from the one or more quantum walks is $\psi(t+\tau)$, and a $j^{th}$ element is represented as (j=1, . . . , N).

6. The method of claim 5 further comprising updating the $j^{th}$ element by applying the following equation:

$$\psi_j(t+\tau) = F_{(j-k),0} = i^{(j-K)} e^{-\frac{i\tau b}{\Delta^2 - V_j\tau}} J_{j-K}\left(\frac{b\tau}{\Delta^2}\right);$$

wherein K is any index between 1 and N, $\psi_K(t)=1.0$, and $\psi_{k\neq K}(t)=0.0$.

7. The method of claim 6 further comprising determining a probability that j is observed by applying the following equation:

$$Pr(x=j)=\psi_j^*(t+\tau)\psi_j(t+\tau)=C_0 e^{-2V_j\tau}J_{j-K}^2\left(\frac{b\tau}{\Delta^2}\right);$$

wherein $C_0$ is a normalization factor that ensures that $\Sigma_{j=1}^{N}$ Pr(x=j)=1.

8. The method of claim 1, wherein:

*Rc*=(0,0,0,0,1,1,0,1,1,2,1,2,3,1,4,5,1,6,2,7,9,11,13,16, 5,20,24,28,34,2,41,49,4,60,72,9,88,105,125,3, 149,22,183,219)

is the amount of rotations necessary to perform the search request with the Grover Search algorithm.

9. The method of claim 1, wherein the global optimization algorithm is represented by:

```
1: Rc = [0, 0, 0, 0, 1, 1, 0, 1, 1, 2, 1, 2, 3, 1, 4, 5, 1, 6, 2, 7, 9, 11, 13, 16, 5, 20, 24, 28, 34, 2, 41,
2:       49, 4, 60, 72, 9, 88, 105, 125, 3, 149, 22, 183, 219]
3: t ← 0;
4: i ← 0;
5: initialize ψ(x0) = 1.0 at a selected position x0;
6: Compute U = F(τ, Δ, b(t), V) by Eq.(9);
7: |ψ⟩= U|ψ⟩;          ▷ perform one iteration of quantum walk to find initial solution x*
8: randomly sample an x* based on probablity distribution ψ²(x);
9: initialize threshold value c = V(x*);
10: while i <MAX-ITER and stop criteria not met do          ▷ main iterations of search
11:    R = Rc[i];
12:    i = i + 1;
13:    if R ≤ R0 then
14:          initialize ψ(xi) = 1.0 at a selected position xi;
15:          Compute U = F(τ, Δ, b(t), V) by Eq.(9);
16:          |ψ⟩= U|ψ⟩;                    ▷ perform one iteration of quantum walk
17:    else
18:          initialize ψ(x) as a uniform distribution by the Hadamard transform;
19:          for r = 1 to R do                   ▷ perform R steps of Grover rotations
20:             apply Grover rotation operator to ψ(x);
21:          end for
22:    end if
23:    randomly sample an x0 based on probability distribution ψ²(x);
24:    if V(x0) < V(x*) then
25:          c ← V(x0);                            ▷ update the threshold
26:          x* ← x0;
27:    end if
28:    t = t + τ;
29: end while.
```

10. The method of claim 1, wherein executing the global optimization algorithm is performed by a quantum computer.

11. The method of claim 1, wherein executing the global optimization algorithm is performed by a quantum computer emulator.

12. A system for global optimization comprising:

a quantum computer comprising:

a quantum transistor;

a fabric of programmable elements comprising couplers and qubits;

support circuitry; and a memory in communication with the quantum transistor, the fabric of programmable elements, and the support circuitry, storing instructions, that when executed cause the quantum transistor to:

receive a search request comprising an input;

determine an amount of rotations necessary to perform the search request with a Grover Search algorithm;

determine that the amount of rotations is less than a predefined amount;

generate one or more quantum walks by determining a functional integral by applying the following equation:

$$F_{n,0}=\sum_{l=0}^{\infty}\left[dq_{n,0}^{(l)}e\, e^{-\frac{i\tau(1+i)b}{\Delta^2-V_n\tau}}(-1)^l i^n\right];$$

$$=\sum_{l=0}^{\infty}e^{-b\tau/\Delta^2}\frac{\left(\frac{b\tau}{2\Delta^2}\right)^{2l+n}}{l!(n+l)!}e^{-\frac{i\tau(1+i)b}{\Delta^2-V_n\tau}}(-1)^l i^n$$

$$=i^n e^{-\frac{ib\tau}{\Delta^2-V_n\tau}}\sum_{l=0}^{\infty}\frac{(-1)^l\left(\frac{b\tau}{2\Delta^2}\right)^{2l+n}}{l!(n+l)!}$$

$$=i^n e^{-\frac{ib\tau}{\Delta^2-V_n\tau}}J_n\left(\frac{b\tau}{\Delta^2}\right)$$

wherein a unitary quantum walk operator (U) is represented as $u_{jk}=F_{(j-k),0}$ for a given space resolution $\Delta$ and time resolution $\tau$;

replace the rotations in the Grover Search algorithm with the one or more quantum walks;

generate a global optimization algorithm based on the Grover Search algorithm and the one or more quantum walks; and execute the global optimization algorithm to identify the input.

13. The system of claim 12, wherein generating the one or more quantum walks further comprises applying the following equation:

$$\psi_j(t+\tau)=\sum F_{(j-k),0\psi_j}(t);$$

and wherein t is a time, $\psi(t)$ is an amplitude associated with the time t, a first quantum walk from the one or more quantum walks is $\psi(t+\tau)$, and a $j^{th}$ element is represented as (j=1, . . . , N).

14. The system of claim 13 further comprising updating the $j^{th}$ element by applying the following equation:

$$\psi_j(t+\tau)=F_{(j-K),0}=i^{(j-K)}e^{-\frac{i\tau b}{\Delta^2-V_j\tau}}J_{j-K}\left(\frac{b\tau}{\Delta^2}\right);$$

wherein K is any index between 1 and N, $\psi_K(t)=1.0$, and $\psi_{k\neq K}(t)=0.0$.

15. The system of claim 14 further comprising determining a probability that j is observed by applying the following equation:

$$Pr(x=j)=\psi_j^*(t+\tau)\psi_j(t+\tau)=C_0e^{-2V_j\tau}J_{j-K}^2\left(\frac{b\tau}{\Delta^2}\right);$$

wherein $C_0$ is a normalization factor that ensures that $\Sigma_{j=1}^{N}$ Pr(x=j)=1.

16. The system of claim 13, wherein:

*Rc*=(0,0,0,0,1,1,0,1,1,2,1,2,3,1,4,5,1,6,2,7,9,11,13,16, 5,20,24,28,34,2,41,49,4,60,72,9,88,105,125,3, 149,22,183,219)

is the amount of rotations necessary to perform the search request with the Grover Search algorithm.

17. The system of claim 12, wherein the global optimization algorithm is represented by:

```
1: Rc = [0, 0, 0, 0, 1, 1, 0, 1, 1, 2, 1, 2, 3, 1, 4, 5, 1, 6, 2, 7, 9, 11, 13, 16, 5, 20, 24, 28, 34, 2, 41,
2:       49, 4, 60, 72, 9, 88, 105, 125, 3, 149, 22, 183, 219]
3: t ← 0;
4: i ← 0;
5: initialize ψ(x_0) = 1.0 at a selected position x_0;
6: Compute U = F(τ, Δ, b(t), V) by Eq.(9);
7: |ψ⟩= U|ψ⟩;            ⊳ perform one iteration of quantum walk to find initial solution x*
8: randomly sample an x* based on probablity distribution ψ^2(x);
9: initialize threshold value c = V(x*);
10: while i <MAX-ITER and stop criteria not met do        ⊳ main iterations of search
11:    R = Rc[i];
12:    i = i + 1;
13:    if R ≤ R_0 then
14:          initialize ψ(x_i) = 1.0 at a selected position x_i;
15:          Compute U = F(τ, Δ, b(t), V) by Eq.(9);
16:          |ψ⟩= U|ψ⟩;                 ⊳ perform one iteration of quantum walk
17:    else
18:          initialize ψ(x) as a uniform distribution by the Hadamard transform;
19:          for r = 1 to R do           ⊳ perform R steps of Grover rotations
20:             apply Grover rotation operator to ψ(x);
21:          end for
22:    end if
23:    randomly sample an x_0 based on probability distribution ψ^2(x);
24:    if V(x_0) < V(x*) then
25:          c ← V(x_0);                          ⊳ update the threshold
26:          x* ← x_0;
27:    end if
28:    t = t + τ;
29: end while.
```

18. A method comprising:

determining rotations necessary to perform a search request with a search algorithm;

generating one or more quantum walks based on the determined rotations by determining a functional integral by applying the following equation:

$$F_{n,0} = \sum_{l=0}^{\infty}\left[dq_{n,0}^{(l)}e\, e^{-\frac{i\tau(1+i)b}{\Delta^2 - V_n\tau}}(-1)^l i_n\right]$$

$$= \sum_{l=0}^{\infty} e^{-b\tau/\Delta^2}\frac{\left(\frac{b\tau}{2\Delta^2}\right)^{2l+n}}{l!(n+l)!}e^{-\frac{i\tau(1+i)b}{\Delta^2 - V_n\tau}}(-1)^l i^n$$

$$= i^n e^{-\frac{ib\tau}{\Delta^2 - V_n\tau}}\sum_{l=0}^{\infty}\frac{(-1)^l\left(\frac{b\tau}{2\Delta^2}\right)^{2l+n}}{l!(n+l)!}$$

$$= i^n e^{-\frac{ib\tau}{\Delta^2 - V_n\tau}J_n\left(\frac{b\tau}{\Delta^2}\right)};$$

wherein a unitary quantum walk operator (U) is represented as $u_{jk}=F_{(j-k),o}$ for a given space resolution $\Delta$ and time resolution $\tau$;

replacing the rotations in the search algorithm with the one or more quantum walks;

generating a global optimization algorithm based on the search algorithm and the one or more quantum walks;

receiving the search request comprising an input; and executing the global optimization algorithm to identify the input.

* * * * *